Sept. 30, 1952          E. EGER          2,612,370

SPRING

Filed Jan. 15, 1949                        2 SHEETS—SHEET 1

INVENTOR.
ERNST EGER
BY Henry P. Truesdell
ATTORNEY.

Sept. 30, 1952 E. EGER 2,612,370
SPRING
Filed Jan. 15, 1949 2 SHEETS—SHEET 2

INVENTOR.
ERNST EGER
BY Henry P. Truesdell
ATTORNEY.

Patented Sept. 30, 1952

2,612,370

UNITED STATES PATENT OFFICE 2,612,370

SPRING

Ernst Eger, Los Angeles, Calif., assignor to United States Rubber Company, New York, N. Y., a corporation of New Jersey Application January 15, 1949, Serial No. 71,060

14 Claims. (Cl. 267—63)

This invention relates to a spring and, in particular, it relates to a type of spring embodying a rubber composition in combination with strain resisting elements.

Most conventional springs of the rubber type are ordinarily in the form of a bushing or sleeve in which the spring effect is obtained by placing the rubber composition in torque. Another kind of conventional spring is the pneumatic type. I have found that a new spring construction may be formed by placing rubber in compression through the medium of inextensive or strain resisting elements and utilizing the compression forces so obtained for the purpose of supporting a load. A spring construction in accordance with the practice of my invention may be utilized in various applications. However, by way of example, I am illustrating herein a spring particularly useful in combination with an automotive vehicle.

It is the object of my invention to provide a rubber-type spring of such size and construction that it may be readily accommodated as a replacement for conventional springs on automotive vehicles. A further object is to provide a rubber spring which functions directly by the compressive action of the rubber. Further objects of my invention are to provide a spring which requires no lubrication and which will function smoothly, quietly and efficiently throughout a wide range of operating conditions; and to provide such a spring which may be manufactured easily and economically.

These and other objects and advantages will appear more fully in the following detailed description when considered in connection with the accompanying drawings; in which.

Figure 1:
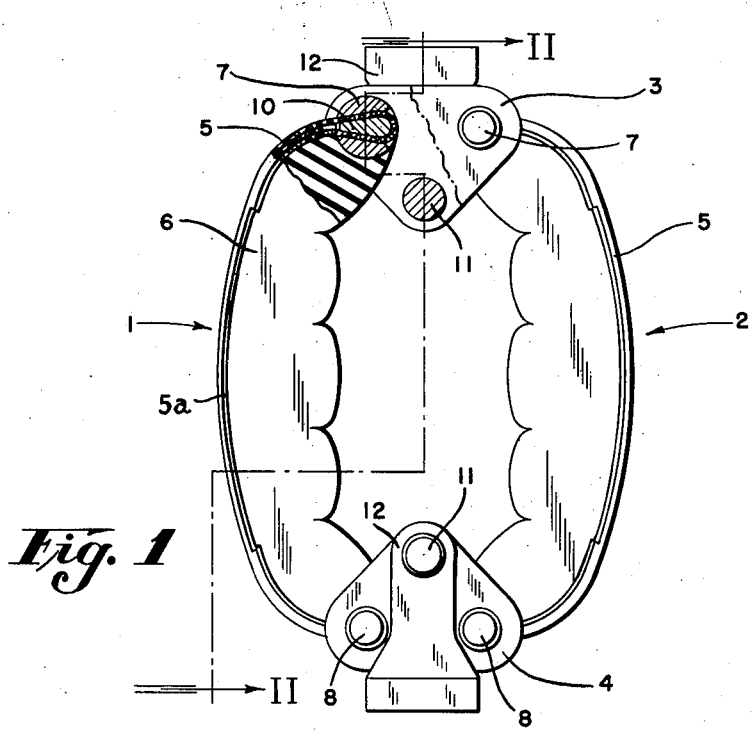
Figure 1 is a side elevational view, partly in section, of a spring forming an embodiment of my invention.

With reference to the drawings and, in particular, to Figure 1, I show an embodiment of my invention in the form of a pair of spring units 1 and 2 positioned in compression and supported by a pair of upper brackets 3 and a pair of lower brackets 4. The spring units comprise essentially layers of fabrics 5 and 5a which is bonded to a relatively thick layer of rubber composition 6.

Figure 3:
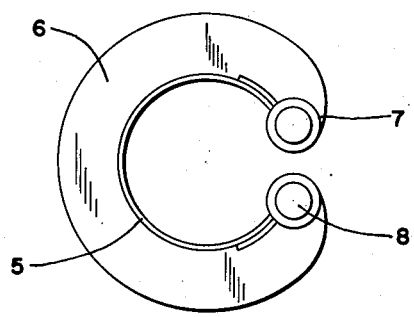
Figure 3 is a side elevational view of a spring unit prior to its being positioned to compress the rubber.

The initial construction of the spring units 1 and 2 is shown in particular in Figure 3. In this view the fabrics 5 and 5a formed of inextensible or strain resisting elements constitute a base upon which the rubber 6 is vulcanized. The fabric 5 as hereinafter described is joined at each end to pins 7 and 8. The fabric 5 may be formed of various forms of fabric, however, I prefer that this fabric be in the form of parallel cords extending from the pin 7 to the pin 8. Such fabric formed of parallel cords is essentially the same type of fabric used in the manufacture of pneumatic tires. These cords may be formed of cotton, rayon, nylon or steel. I prefer to use the steel or wire cord fabric because of its high tensile strength and low elongation properties.

The layer of fabric 5a is essentially the same as the ply of fabric 5, except that the cords in the fabric 5a extend in a direction at right angles to the cords in the ply 5. The principal purpose of the ply 5a is to assist in maintaining the cords in the fabric 5 in a parallel relationship. The cords in the ply 5a are preferably formed of cotton or rayon.

Figure 2:
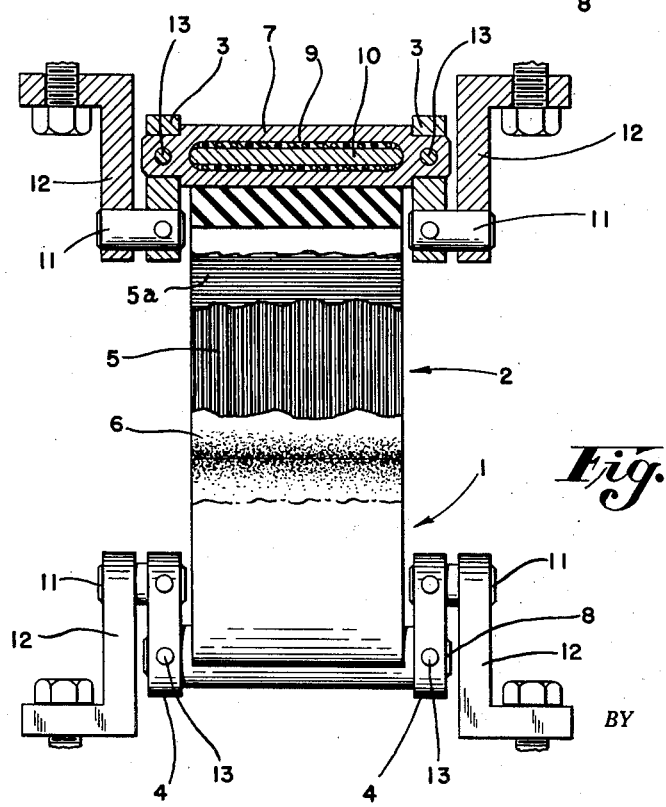
Figure 2 is an end elevational view thereof, partly in section, the section being taken along lines II—II of Figure 1.

The pins 7 and 8 are each provided with a longitudinally extending slot 9 (Fig. 2) which is V-shaped in cross section. The fabric 5 is looped around a wedge 10 and the wedge with the fabric looped there around is fitted into the V-shaped slot 9 so that each end of the fabric becomes in effect locked or anchored with the pins 7 and 8.

In accordance with conventional practice as in the manufacture of pneumatic tires, the fabric 5, if formed of cotton, rayon or nylon, is coated with an adhesive and thereafter a thin layer of rubber composition is attached to each side of the fabric for encasing the cords and maintaining them in parallel relationship. When wire cords are used to form the fabric 5, it is customary to form a deposit of brass plate on the wire cords and thereafter apply a layer of rubber to each side of the fabric for encasing the wire and maintaining the cords in spaced parallel relationship. An example of the wire fabric herein used consists of a wire cord formed of steel filaments twisted together to constitute a cord having a gage of .036 inch and having a tensile strength of approximately 190 lbs. These wire cords are laid together in parallel formation and spaced apart to the extent of 20 cords per inch.

After the rubber covered cords forming the fabric 5 are assembled with the pins 7 and 8, and the ply of fabric 5a is in position, the layer of rubber 6 is applied thereto on one side only of the fabric. This rubber layer 6 is relatively thick such, for example, as 20 times the thickness of the fabric. Also the rubber composition is such that upon vulcanization, its resiliency represents 45 durometer. However, good results have also been obtained by utilizing a stock having a durometer from 35 to 55. After the rubber stock 6 is assembled with the fabric 5, the unit is bent in circular shape as shown in Figure 3 and placed into a mold and vulcanized. Such bending is made possible by the fact that the assembled unit is not rigid, that is, both the fabric and the rubber are flexible. It is to be noted that in its relaxed vulcanized position, the fabric 5 is located at the inner periphery of the unit.

In actual use and as shown in Figure 1, the vulcanized spring unit is inverted so that the fabric moves from the inner periphery to the outer periphery. The flexibility of the fabric and of the rubber permits such inversion. As a result of this condition, the thick layer of rubber 6 is forcibly deformed into a reverse arcuate shape in a state of compression and exhibits a spring effect between the pins 7 and 8. When two units 1 and 2 are used in pairs, such as the units 1 and 2, a balanced condition results whereby an effective spring action is obtained in a direction transversely of the pins 7 and 8.

The ends of the pins 7 and 8 are turned down to form a shoulder for engagement with the triangular brackets 3 and 4 respectively. A pin 11 pinned to the triangular brackets 3 and 4 forms a projection which engages a supporting member 12. A similar supporting member is connected to each of the upper brackets 3 and to each of the lower brackets 4. Also, the supporting brackets 12 may be attached to various means between which the spring is intended to function.

Since the spring units 1 and 2 possess an inherent tendency to reverse themselves and assume a position such as shown in Figure 3, it is desirable to attach the pins 7 and 8 in fixed position relative to the brackets 3 and 4. This is accomplished by compressing the spring units to substantially ½ of their normal flexing range and to then drill and press in a pin 13 through the ends of each of the pins 7 and 8, thus locking the pins 7 and 8 with the brackets 3 and 4. Because the pins 7 and 8 are locked with the brackets 3 and 4, the relaxed position of the spring assembly is restrained from assuming a maximum extended position. This provides a snubbing action when the spring, in operation, approaches its maximum extended position.

Figure 4:
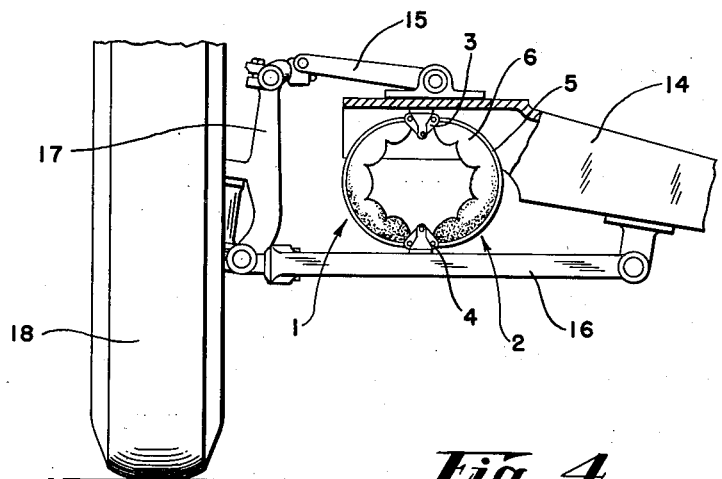
Figure 4 is a front elevational view, partly in section, of a portion of the front end of an automotive vehicle illustrating the application of the spring to the vehicle.

Referring to the drawings and, in particular, to Figure 4, I show an application of the spring of my invention to the front wheel of a conventional automotive vehicle. In this illustration, it is proposed that the spring of my invention replace the original coil spring independent wheel suspension. This illustration, which is a front view, partly in section, shows a main frame 14 to which are pivotally attached upper and lower parallel links 15 and 16, respectively, pivotally connected at the end to the steering head 17. The steering head, in turn, through conventional associated mechanisms, supports a tire 18. Interposed between the frame 14 and the lower parallel links 16 is the spring of my invention consisting essentially of spring units 1 and 2 and their supporting brackets 3 and 4. The wheel is thereby resiliently supported, by reason of the flexibility and resilience of the spring units.

Figure 5:
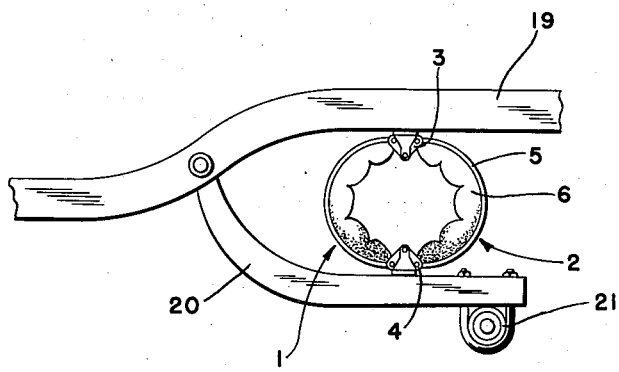
Figure 5 is a side elevational view of a portion of an automotive chassis illustrating the application of the spring of my invention to the rear axle of an automotive vehicle.

Figure 5 shows a portion of a side view of a vehicle illustrating a rear suspension application. To a main frame 19 is pivotally attached an arm 20 which supports the rear axle 21. The spring of my invention designated by spring units 1 and 2 is interposed between the frame 19 and the arm 20. By this arrangement, it is possible to obtain a soft spring action capable of sustaining the desired load by means of the compression of the rubber layer 6 bonded to the inextensible fabric 5. Such compression is made possible by the flexibility of the fabric. In actual construction, an example of such spring is one having a unit width of from 4 to 5 inches and having a spring travel distance equal to from 6 to 10 inches. It has been demonstrated that a spring of this type consisting of a pair of units 1 and 2 is capable of performing satisfactorily while supporting a load in the order of 1200 lbs.

While I have referred to a rubber composition, as constituting the compression medium for the spring, it is to be understood that reference to rubber includes both natural and synthetic rubbers. Also, while I have shown the application of my invention as relating to a suspension for automotive vehicles, it is to be understood that the spring may be used for various other purposes in replacement of conventional spring suspensions.

Having thus described my invention what I claim and desire to protect by Letters Patent is:

1. A spring comprising, a pair of opposed supports adapted for relative movement toward and away from each other, and a spring unit connecting with the pair of opposed supports, said spring unit comprising, a layer of flexible strain resisting elements anchored at each end of said layer to said supports, and a body of rubber composition bonded to the layer of strain resisting elements, said layer of strain resisting elements and said body of rubber being supported in an arcuate position, the rubber body being on an inner perimeter of such arc and being maintained in a state of compression.

2. A spring comprising, a pair of opposed supports adapted for relative movement toward and away from each other, and a spring unit connecting with the pair of opposed supports, said spring unit comprising, a layer of flexible strain resisting elements anchored at each end of said layer to said supports, and a body of rubber composition bonded to the layer of strain resisting elements, said spring unit when in a relaxed state having an arcuate form with the strain resisting elements located at an inner perimeter of such arc, and said spring unit being supported between said opposed supports in an arcuate position with the strain resisting elements located at an outer perimeter of such arc which is a reverse arc from the arc assumed in the relaxed state of the spring unit, whereby the body of rubber is maintained in a state of compression.

3. A spring comprising, a pair of opposed supports adapted for relative movement toward and away from each other, and a spring unit connecting with the pair of opposed supports, said spring unit comprising, a pair of spaced parallel pins, a layer of strain resisting elements connected at each end of the layer to the spaced pins, and a resilient body of rubber composition constituting a relatively thicker layer than said layer of strain resisting elements bonded to the layer of strain resisting elements, said spring unit having a natural arcuate form with said strain resisting elements on the inner perimeter of the arc and with said resilient rubber body on the outer perimeter of the arc when removed from said supports and when in an unloaded condition, said layer of strain resisting elements and said body of rubber being supported in the spring unit in an arcuate position the rubber body being on an inner perimeter of such arc in a state of compression and the strain resisting elements being on an outer perimeter of such arc.

4. A spring comprising, a pair of opposed supports adapted for relative movement toward and away from each other, and a spring unit connecting with the pair of opposed supports, said spring unit comprising, a plurality of cords in parallel formation forming a layer of strain resisting elements, and a body of rubber composition bonded to the layer of strain resisting elements, said layer of strain resisting elements and said body of rubber being supported in a forcibly deformed arcuate position with the rubber body at an inner perimeter of said arc whereby the body of rubber is maintained in a state of compression.

5. A spring comprising, a pair of opposed supports adapted for relative movement toward and away from each other, and a spring unit connecting with the pair of opposed supports, said spring unit comprising, a pair of spaced parallel pins each having a tapered slot extending longitudinally thereof, a layer of strain resisting elements anchored of each end of said layer to said supports having each of its ends looped through one of said slots, a tapered wedge fitted with each slot for locking the ends of the layer of strain resisting elements with the pins, and a body of rubber composition bonded to the layer of strain resisting elements, said layer of strain resisting elements and said body of rubber being supported in an arcuate position with the body of rubber being located on the inside of such arc and being in a state of compression.

6. A spring comprising, a pair of opposed supports adapted for relative movement toward and away from each other, and a pair of spring units facing each other and connecting with the pair of opposed supports, each of said spring units comprising, a layer of flexible strain resisting elements anchored at each end of said layer to said supports, and a body of rubber composition bonded to the layer of strain resisting elements, said layer of strain resisting elements and said body of rubber being supported in an arcuate position with the body of rubber being located on the inside of such arc in a state of compression.

7. A spring comprising, a pair of opposed supports adapted for relative movement toward and away from each other, and a pair of spring units facing each other and connecting with the pair of opposed supports, each of said spring units comprising, a plurality of cords in parallel formation forming a layer of strain resisting elements, and a body of rubber composition of a hardness of from 35 to 55 durometer bonded to the layer of strain resisting elements said spring unit when in a relaxed state having an arcuate form with the strain resisting elements located at an inner perimeter of such arc, said spring unit being supported in an arcuate position with the strain resisting elements located at the outer perimeter of the arc which is a reverse arc from the relaxed state of the spring unit, whereby the body of rubber is maintained in a state of compression.

8. A spring comprising, a pair of opposed supports adapted for relative movement toward and away from each other, and a pair of spring units facing each other and connected with the pair of opposed supports, each of said spring units comprising, a plurality of cords in parallel formation forming a layer of strain resisting elements, and a body of rubber composition bonded to the layer of strain resisting elements, said body of rubber composition having a thickness of approximately 20 times the thickness of the layer of strain resisting elements said spring unit when in a relaxed state having an arcuate form with the strain resisting elements located at an inner perimeter of such arc, and said spring unit being supported in an arcuate position with the strain resisting elements located at the outer perimeter of the arc which is a reverse arc from the relaxed state of the spring unit, whereby the body of rubber is maintained in a state of compression.

9. A spring comprising, a pair of opposed supports adapted for relative movement toward and away from each other, and a pair of spring units facing each other and connecting with the pair of opposed supports, each of said spring units comprising, a plurality of cords in parallel formation forming a layer of strain resisting elements, and a body of rubber composition of a hardness of from 35 to 55 durometr bonded to the layer of strain resisting elements, said body of rubber composition having a thickness of approximately 20 times the thickness of the layer of strain resisting elements said spring unit when in a relaxed state having an arcuate form with the strain resisting elements located at an inner perimeter of such arc, and said spring unit being supported in an arcuate position with the strain resisting elements located at the outer perimeter of the arc which is a reverse arc from the relaxed state of the spring unit, whereby the body of rubber is maintained in a state of compression.

10. A spring comprising, a pair of opposed supports adapted for relative movement toward and away from each other, and a spring unit connecting with the pair of opposed supports, said spring unit comprising, a pair of spaced parallel pins, a layer of flexible strain resisting elements, a resilient body of rubber composition constituting a relatively thicker layer than said layer of strain resisting elements bonded to the layer of strain resisting elements said spring unit when in a relaxed state having an arcuate form with the strain resisting elements located at an inner perimeter of such arc, said spring unit being supported in the spring unit in an arcuate position with the strain resisting elements located at the outer perimeter of the arc which is a reverse arc from the relaxed state of the spring unit, whereby the body of rubber is maintained in a state of compression, and means for locking the pins with the supports for maintaining the spring unit in a reverse arcuate and compressed state.

11. A spring comprising, a pair of opposed supports adapted for relative movement toward and away from each other, and a spring unit connecting with the pair of opposed supports, said spring unit comprising, a plurality of cords in parallel formation forming a layer of strain resisting elements, a second layer of strain resisting elements bonded to said first layer and constituting cords in parallel formation extending in a direction at right angles to the cords in said first named layer, and a body of rubber composition bonded to the layers of strain resisting elements, said layers of strain resisting elements and said body of rubber being supported in an arcuate position with the body of rubber maintained in a state of compression.

12. A spring comprising, a pair of opposed supports adapted for relative movement toward and away from each other, and a spring unit connecting with the pair of opposed supports, said spring unit comprising, a pair of plies of cords in parallel relation forming layers of strain resisting elements, the cords in one layer extending at right angles to the direction of the cords in the other layer, and a body of rubber composition bonded to the layers of strain resisting elements, said layers of strain resisting elements and said body of rubber being supported in an arcuate position with the body of rubber maintained in a state of compression.

13. A spring comprising, a pair of opposed supports adapted for relative movement toward and away from each other, and a spring unit connecting with the pair of opposed supports, said spring unit comprising, a layer of flexible strain resisting elements anchored at each end of said layer to said supports, means for locking the strain resisting elements with the pair of opposed supports and a body of rubber composition bonded to the layer of strain resisting elements, said layer of strain resisting elements and said body of rubber being supported in an arcuate position with the body of rubber maintained in a state of compression.

14. A spring comprising, a pair of opposed supports adapted for relative movement toward and away from each other, and a spring unit connecting with the pair of opposed supports, said spring unit comprising, a pair of spaced parallel pins, a layer of flexible strain resisting elements, connected at each end of the layer to the spaced pins, means for locking the pins with the supports, and a resilient body of rubber composition constituting a relatively thicker layer than said layer of strain resisting elements bonded to the layer of strain resisting elements, said spring unit having a natural arcuate form with said strain resisting elements on the inner perimeter of the arc and with said resilient rubber body on the outer perimeter of the arc when removed from said supports and when in an unloaded condition, said layer of strain resisting elements and said body of rubber being supported in the spring unit in an arcuate position with the body of rubber maintained in a state of compression.

ERNST EGER.

REFERENCES CITED

The following references are of record in the file of this patent:

UNITED STATES PATENTS

| Number | Name | Date |
|---|---|---|
| 57,365 | Murphy | Aug. 21, 1866 |
| 1,427,933 | Bell | Sept. 5, 1922 |
| 2,251,453 | Jackson | Aug. 5, 1941 |